Fig. 1

INVENTOR.
JOHN A. YOUNG

INVENTOR.
JOHN A. YOUNG
BY Staelin & Overman
ATTORNEYS

United States Patent Office 3,492,186
Patented Jan. 27, 1970

3,492,186
TANK FABRICATION FORMING MANDREL AND STRIPPER ASSEMBLY
John A. Young, Newark, Ohio, assignor to Owens-Corning Fiberglas Corporation, a corporation of Delaware
Filed Mar. 15, 1967, Ser. No. 623,383
Int. Cl. B31c *13/00;* B29h *17/16;* B65h *81/00*
U.S. Cl. 156—425                              30 Claims

ABSTRACT OF THE DISCLOSURE

A rotatable mandrel for forming large reinforced plastic tank halves, comprising a double walled shell structure wherein the inner wall is cylindrical and of steel plate for rigid support. The outer wall is a frustum of reinforced plastic, made in segments, with axial ribs along the edges of the segments. Floating links extend between the abutted reinforced plastic ribs and link anchor bars lying axially along the outer surface of the inner wall. Combination push and pull screws, accessible from inside the inner wall, adjust the outer shell coaxial to the inner wall.

A sealed hydraulic push off system is mounted on the back side of a large fabricated steel ring at the large end of the mandrel. Being sealed, the hydraulic system permits mandrel rotation during the forming operation. The system comprises a plurality of peripherally spaced cylinders, with the piston rods extended through notches in the fabricated ring. The piston rods all bear equally against a stripping collar, a large ring of reinforced plastic, adapted to slide along the outer surface of the mandrel. The stripping collar lies against the fabricated ring during the part forming operation, and is moved ahead a small distance to strip the cured part so that it can then be freely slid the rest of the way, off the mandrel.

Air conduits extend through the surface of each segment of the outer shell so that compressed air can be applied between the mandrel and the cured part for initial break away before the stripping operation.

---

This invention relates to apparatus for producing tanks of reinforced synthetic resins, or often popularly referred to as reinforced plastics; and, more particularly, to a forming mandrel system including a push off mechanism, for forming very large tank halves and for stripping the formed parts from the mandrel.

The problem

In the production of reinforced plastic tanks, it is most economical to form tank halves over the free end of a cantilevered rotatable mandrel. The mandrel is tapered in order to permit release of the tank half. Two such halves are then butt joined and welded together to produce a complete tank.

The system and process are versatile in that part formation is fast, and manufacturing equipment is much more economically utilized. Further, tank halves of differing sizes can be produced very readily by using different portions of the mandrel.

By comparison, the prior art has made reinforced plastic tank shells by forming the shell over the outside of a solid mandrel, such as made of a soluble salt or of a relatively low melting metal. The mandrel, after the part is completed, is either dissolved or melted out thus leaving the completed tank. This is a very tedious and expensive operation. A new mandrel is needed each time a part is made and, thus, this cost is repeated for each unit. Further, this is a very tedious operation due to mandrel formation for each part, set up time, etc. Therefore, by comparison, the tank half manufacturing process is much more economical and versatile.

It is desirable, however, to have the taper of the mandrel as low as possible so that the finished tank is substantially cylindrical. Reduction of taper is the factor which causes problems.

Thus, when the reinforced plastic shell cures, it has a tendency to shrink on or grip to the mandrel quite tightly. Since the cured, reinforced resin is very strong, high forces are required for pushing the finished part off the mandrel. In an exemplary case in the production of a 6,000 gallon capacity storage tank, the tank half shell has a diameter of about 8 ft. and a length of about 10 ft. A force of approximately 50 tons is required to push the shell off the mandrel.

It is extremely important that the pushing be absolutely uniform all around the tank half so that the part will not be cocked and, thus, not bind to the mandrel. Thus, the part and the mandrel must both be protected from damage.

Accordingly a novel mandrel incorporating an improved and unique part push off mechanism would provide a substantial advancement to the art.

Also, it is desirable to have the mandrel perfectly round in all portions so that parts will be of uniform shape and cross section, and so that less taper can actually be tolerated. In the production of large tanks of 8 to 10′ diameter, retention of roundness of the mandrel presents a very challenging problem. The known mandrels of the prior art have been without provision for adjusting roundness, once fabricated. Subsequent warpage during use has required expensive repairs.

Therefore, a novel mandrel having a unique roundness adjusting system would provide a further substantial advancement to the art.

The mandrel and push off system of the present invention provide such effects by improved and novel means.

Objects, therefore, of the present invention are to provide a novel forming mandrel in combination with a novel, hydraulic push off stripper system.

Substantial novelty resides in the construction of the mandrel of the present invention, in that it incorporates a unique combination of materials. This combination includes a steel inner support shell and a reinforced plastic outer shell, supported from the inner shell by a plurality of axially extending ribs and floating links, with roundness adjusters for the outer shell exposed within the inner shell.

Further, novelty resides in the sealed hydraulic push off system. The hydraulic system is unique in that it utilizes a plurality of hydraulic rams spaced around the periphery of the tank half and these all push with the same force at the open end of the tank half. Additional novelty also resides in the closed hydraulic system by which these rams are actuated. The closed system permits mandrel rotation during the part lay-up operation.

By this invention, therefore, a mandrel embodying several novel features, and a unique hydraulic ram push off system are provided.

The manner in which these and other objects and advantages of the invention are developed will become apparent from the following description and appended claims, taken in conjunction with the accompanying drawings, wherein:

Environment for the invention

Figure 1:
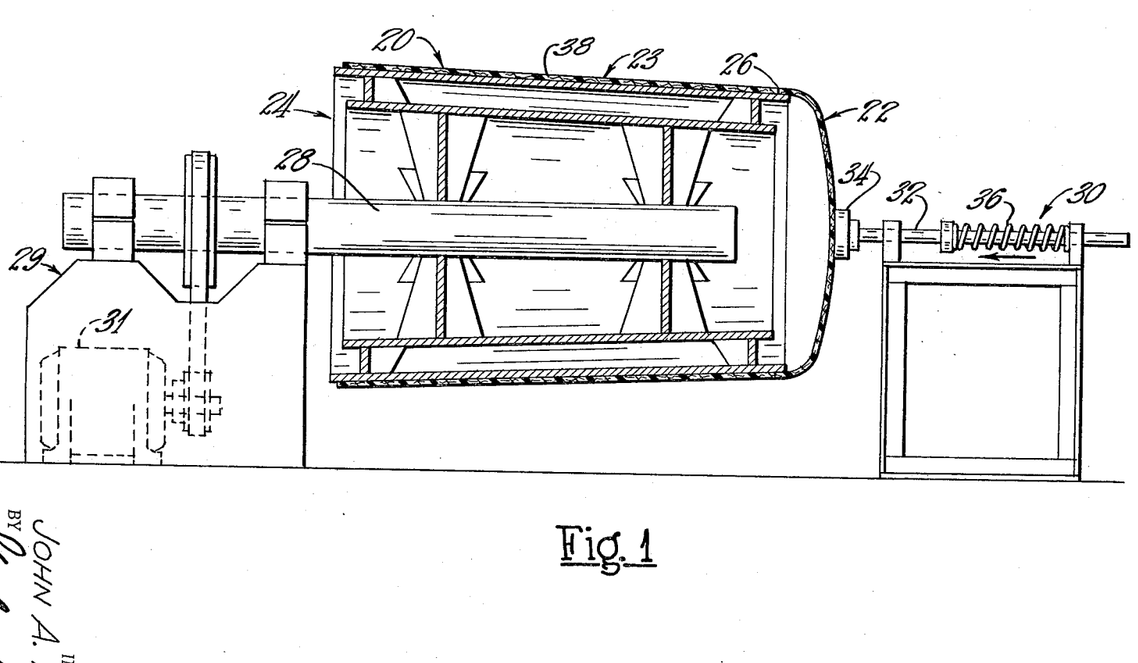
FIGURE 1 is a side-elevational view, partly in section, of an exemplary winding mandrel, and showing a dead-center mechanism, illustrating the environment for the present invention.

FIGURE 1

This figure illustrates the manner in which the mandrel of invention is used to make a hollow, reinforced plastic tank half shell 20, which is similar to a large cup. The forming mandrel 24 of this figure is exemplary—for illustrative purposes. The tank half 20 comprises an end cap 22, which is made by a suitable lay-up technique at another location separate from the forming mandrel 24. The end cap 22 is cured to a handleable state and is then brought to and placed against the end of the mandrel 24. Note the hypothetical joint 26 at the peripheral edge of the cap 22, between the edge of the end cap and the frustum-shaped wall element 23, which is subsequently formed on the outer surface of the mandrel 24.

The mandrel 24 is a large, hollow, open-ended frustum that is supported for rotation on a shaft 28. The shaft 28 is cantilevered from a large base 29 so that the small end of the mandrel is exposed in order to receive the tank end cap 22, and for purposes of stripping the completed tank half 20 from the mandrel. The slight taper of the outer surface of the mandrel 24 provides for part release, so that the completed tank half shell 20 can be slid off the small end of the mandrel. Within the large base member 29, there is a driving motor 31 and appropriate gear reduction mechanism for turning the central support shaft 28.

The end cap 22 is held in position at the free end of the mandrel 24 by means of a dead-center mechanism 30. The dead-center mechanism 30 includes an axially movable shaft 32 having a large, rubber compression pad 34 rotatably mounted at one end. A spring 36, or other suitable biasing means, urges the shaft 32 in a direction to force the compression pad 34 against the end cap 22 and firmly hold the end cap in position at the end of the mandrel 24 during a tank half forming cycle.

Also, as shown in FIGURE 1, a layer of reinforced plastic 38 has been applied to cover the outer surface of the mandrel 24 and is coupled with the end cap 22 during the curing process.

After the tank half 20 is fully cured, pressure is applied against the tank half to force it off the mandrel 24. Heretofore, efforts to remove the tank half 20 have involved application of all push force against the closed end, or the end cap 22. When it is considered that up to fifty (50) tons of force are required for the stripping operation, it will be understood that the stresses imposed against the end cap 22 can be so great as to cause possible damage. Application of all force at one localized area, therefore, is undesirable because it may impart undue stress against the tank half 20 as well as against the mandrel 24.

Also, heretofore, prior efforts to push the tank half 20 off the mandrel 24 by pushing against the open end of the tank half, have employed mechanical jacks driven from a common power source so as to provide uniform push all around the periphery of the tank half. No known efforts have been made to strip the tank half 20 from the mandrel 24 by pushing against the open end of the tank half with hydraulic means. The reason is that no known way has been found heretofore for applying hydraulic pressure uniformly all around the open periphery of the tank half.

A novel feature of the present invention is that the push force is equally distributed all around the back or open end of the tank half 20. As the present description progresses it will become evident that uniform push all around the open periphery is provided by a novel hydraulic stripper. The novel hydraulic stripper incorporates a unique closed hydraulic system that is mounted directly at the back end of the mandrel 24 and rotates with the mandrel. Further, by this arrangement, a correspondingly uniform reverse force is imposed against the back end of the mandrel 24. Thus, neither the mandrel 24 nor the tank half 20 is distorted during the push off operation. This provides long life and improved durability for the equipment.

The invention; the mandrel

Figure 2:
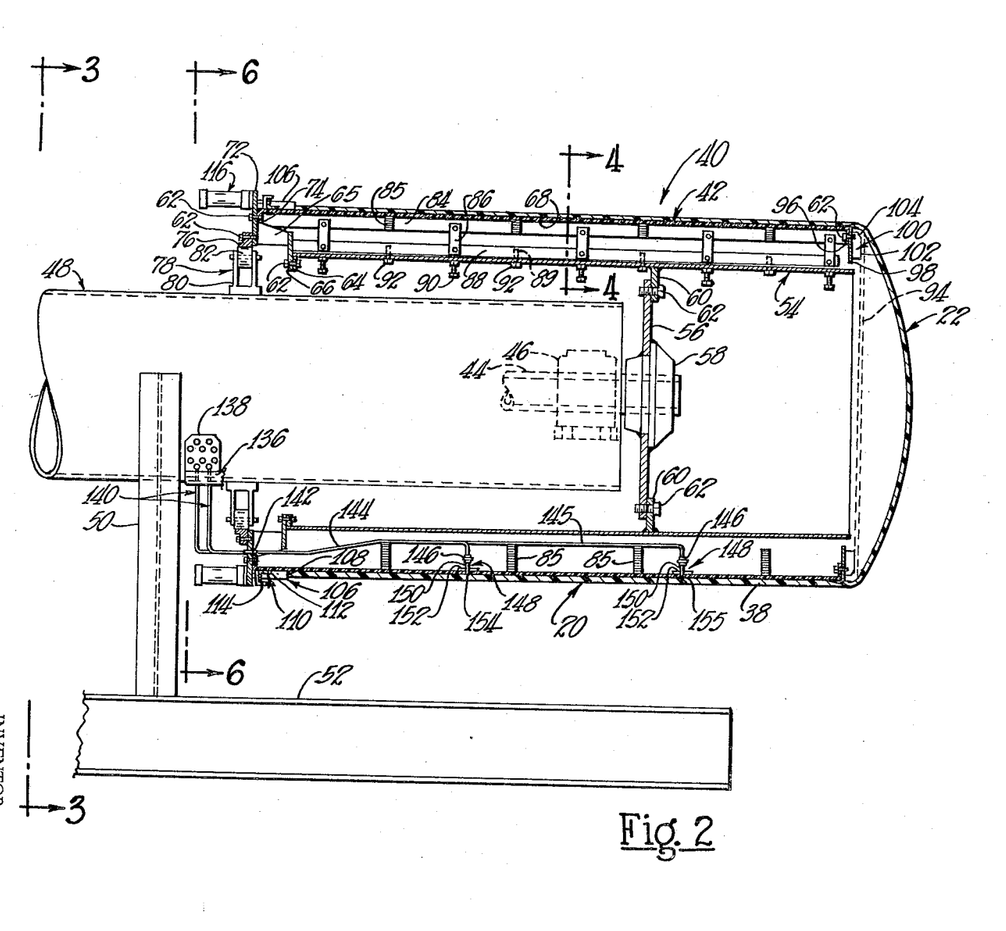
FIGURE 2 is a longitudinal sectional view of the winding mandrel of invention, taken along the line 2—2 of FIGURE 3, and illustrating the floor mount and showing part of the hydraulic system.
Figure 3:
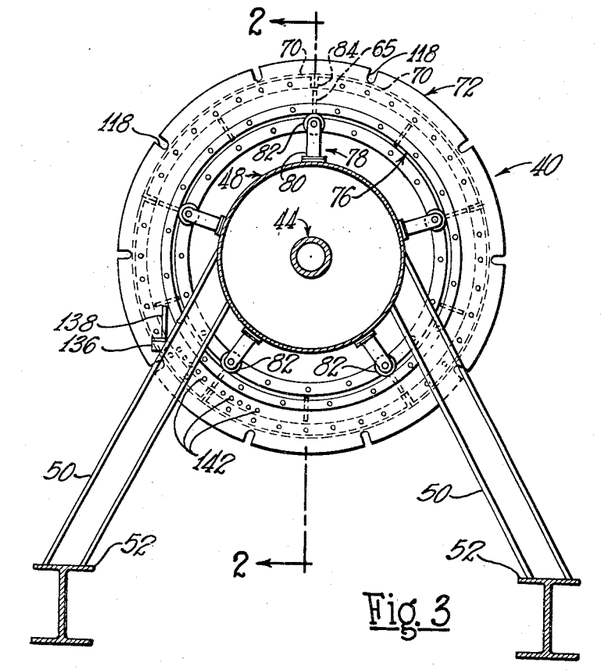
FIGURE 3 is an end elevational view, taken along the line 3—3 of FIGURE 2, and showing the welded steel end structure 72 without the hydraulic system.

As shown in FIGURES 2 and 3, the present invention comprises a large mandrel 40 that includes a double-walled shell structure 42. The shell structure 42 is mounted for rotation on a cantilevered shaft 44. The shaft 44 is rotatably supported by means of bearings 46 carried within a cantilevered cylindrical support housing 48. The back end of the support housing 48 is secured to standards 50 which extend down to floor support beams 52. The floor support beams 52 are elongated and extend forwardly beneath the mandrel 40 and thus provide stable support for the entire mechanism.

A drive motor and gear-reduction mechanism are attached to the shaft 44 for control rotation. These are not shown because they form no part of the invention.

The double-walled shell structure 42 extends back over the cantilevered support housing 48. A mandrel chassis 54 comprises the interior of the double-walled shell structure 42. It is by means of the mandrel chassis 54 that the entire double-walled shell structure 42 is fastened to and supported by the central drive shaft 44. The mandrel chassis 54 comprises a large welded steel annulus, or inner wall, which is uniformly cylindrical from end to end. At the front end of the shaft 44, there is a radial wall 56, extending between a hub 58, fastened to the shaft 44, and a fabricated radial roundness-controlling ring 60 which is secured to the inner surface of the steel mandrel chassis wall 54. The radial wall 56 and the ring 60 are fastened together by means of bolt 62.

The back end of the double-walled outer shell structure 42 terminates at an inner stiffening and roundness controlling ring 64 which is welded to and fabricated with the back end of the annular chassis wall 54. A larger ring 66 is fastened, by bolts 62, to the ring 64. Bracket arms 65 extend between the ring 64 back to a welded steel end structure 72. This generally centers the chassis 54 relative to the outer shell 68.

Figure 4:
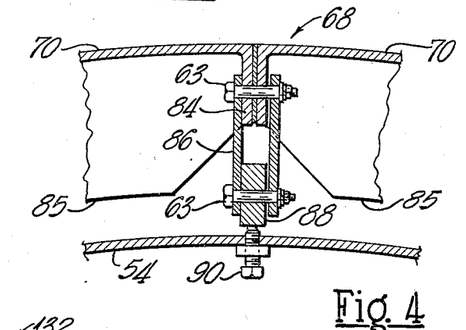
FIGURE 4 is an enlarged, fragmentary, sectional view, taken as along a line 4—4 of FIGURE 2.

The shell structure 42 also includes an outer shell 68 that is made up of a plurality of arcuate segments 70, as shown in FIGURES 3 and 4, to be later described in detail. These segments 70 are bolted together along their edges to form the outer annular shell 68. The outer shell 68 is tapered inwardly, slightly, from the back end to the forward exposed end and is made up of reinforced plastic to provide, with the steel mandrel chassis 54, a novel combination of materials. It is believed that the combination of steel and plastic is novel due to the fact that the plastic provides an ideal part-forming surface and the steel chassis 54 provides an ideal environment for rigidity and a strong skeleton from which the reinforced plastic outer shell 68 can be supported. Further, as will become evident during later portions of this description, the outer shell 68 is adapted to be accurately adjusted to roundness by an adjusting screw mechanism carried by the chassis 54 and exposed on the inner surface thereof. Thus, if during operation of the invention, the outer surface should become warped or distorted, corrections can be made to restore the original accurate circular profile.

The outer shell 68 being slightly tapered, takes the form of a large frustum. The slight taper provides part release so that a formed tank half can be pushed off the outer smaller exposed end, in the manner described relative to FIGURE 1.

At the back end of the outer shell 68 there is the welded steel end structure 72 of annular configuration. This end structure 72 actually provides a foundation against which the back end of the outer shell 68 is abutted and fastened and further provides a support for the hydraulic system and the push off mechanism which will be later described.

The end structure 72 is fastened by bolts 62 to radial transverse end webs 74, FIGURE 2, forming the back edges of each of the arcuate segments 70.

Additionally, the end structure 72 forms the means by which the inner end of the mandrel 40 is rotatably supported. Thus, a roller raceway ring 76 is fastened by bolts 62 to the inner periphery of the annular end structure 72.

A plurality of roller mounts 78 are secured to the outer surface of the support housing 48 and comprise U-shaped brackets 80 having rollers 82 journaled at the free ends of the arms of the brackets. The rollers 82 engage the inner periphery of the roller raceway ring 76 and thus the mandrel 40 is supported for free rotation at the back end, around the cantilevered support housing 48.

The connection to the shaft 44 at the front end, by means of the radial wall 56, provides the driving power for rotating the mandrel 40, as required, and maintains axial alignment of all parts.

The double walled shell structure in detail

As shown in FIGURE 3, there are five arcuate segments 70 in the outer shell 68. As best shown in FIGURE 4, along each edge these segments 70 have radial and axially extending flanges 84. These flanges 84 provide the means by which the segments 70 are secured to one another in side-by-side relation. Thus, shoulder screws 63 extend through the flanges 84 and through pairs of radial links 86 that embrace the sides of the flanges 84. The shoulder screws 63 do not clamp the links 86 to the flanges 84; therefore, the links are left free to move relative to the flanges. This provides a floating relationship between the chassis 54 and the outer shell 68. The radial orientation of the links 86 and the manner in which the pairs of links are uniformly spaced along the axial length of the mandrel 40 is illustrated best in FIGURE 2. Though there is a floating relationship between the links 86, the bracket arms 65 preserve a fixed axial relationship between the outer shell 68 and the chassis 54 via the end structure 72.

As shown in FIGURES 2 and 4, arcuate, honeycombed roundness ribs 85 are secured to the inner side of the outer shell 68. These stiffen the outer shell 68 and supplement the strength provided by the radial and axial flanges 84 that extend along the edges of the arcuate segments 70.

Along the outer surface of the chassis wall 54, and in axial alignment with each pair of flanges 84, and thus, also in alignment with the pairs of links 86 are axially extending anchor bars 88. The anchor bars 88 are secured to the outer surface of the chassis 54 and by a connection to the links 86, provide the means by which the outer shell 68 is fastened to the chassis 54 and the means by which the outer shell is adjusted to proper circular roundness.

Roundness adjustment

*Push screws.*—As best shown in FIGURES 2 and 4, push screws 90 are inserted through the chassis wall 54 at each of the locations corresponding to a pair of links 86. These bear against the bottom surfaces of the anchor bars 88 and can be turned out, thus being effective to force the outer shell 68 outwardly for roundness adjustment. Withdrawing the push screws 90 permits the pull screws 92, described below, to pull the outer shell 68 inwardly for roundness adjustment.

*Pull screws.*—Between the push screws 90, and thus between the link locations, there are pull screws 92. These are passed through holes in the chassis 54 and into threaded holes 89 in the anchor bars 88. These pull screws 92 hold and lock the position of each anchor bar 88, as established by the push screws 90.

The front end of the mandrel

The front end of the mandrel 40 is adapted to support either a convex end cap 22, of the nature shown in FIGURES 1 and 2, or a flat end cap 94 as shown schematically in FIGURE 2. The front edge of each arcuate segment 70 of the outer shell 68 is provided with a radial, transverse end web 96. A fabricated annular head end cover plate 98 is fastened to the exposed front side of the webs 96 by means of bolts 62.

Each cap support plates 100 are fastened to the exposed face of the head end cover plate 98 and these carry flat surfaces 102 and angular surfaces 104. The flat surfaces 102 are adapted to abut the corresponding flat inside surface of the flat end cap 94, shown schematically; and the angular surfaces 104 are adapted to about the corresponding angular inside surface of a convex end cap 22.

A dead center mechanism is used to hold a selected end cap 22 or 94 in place at the end of the mandrel 40, as illustrated in FIGURE 1.

The air loosening system

An air lines terminal bracket 136 is fastened to the back side of the welded steel end structure 72. An air line terminal 138 is fastened to the bracket 136. From the terminal 138, pairs 140 of air lines lead to spaced points on each segment 70 of the outer shell 68. Thus, as shown in FIGURE 2, a pair of tubular lines 140, with appropriate fittings, lead from the air line terminal 138 to lead out nipples 142 secured in the welded steel end structure 72. The grouping of the ten (10) air line lead out nipples 142 is also shown in FIGURE 3. These are spaced in a rather short arc on the welded steel end structure 72 in a workmanlike manner.

As shown in FIGURE 2, one line 144 from each pair leads to a tube union 146. A connector 148, comprising a short nipple 150 welded in a flange plate 152 leads the line through a hole 154 to the outer surface of the outer shell 68. The hole 154 is positioned in the rear half of the mandrel outer surface. Also, as shown in FIGURE 2, the other line 145 from each pair 140 leads to a tube union 146 and thence to a connector 148 and thus through a hole 155 to the outside surface of the outer shell 68.

By this arrangement, compressed air is passed through the lines 144 and 145 between the formed tank half 20 and the outer shell 68. By so operating, the tank half shell 20 can be initially broken away from the mandrel 40, prior to starting the push off operation. In actual practice, the mandrel is rotated during the forming operation for the production of the tank half, including the cure cycle under infra-red radiation which is effective to cure the resin. Then, when the tank half shell 20 is completely cured and ready to be released, the rotation of the mandrel 40 is stopped in approximately the orientation illustrated in FIGURE 3. At this time, a workman will attach pairs of lines to each of the pairs 140 on the air line terminal 138 in a consecutive order to thereby break the formed part away from each segment 70. By operating in this manner the entire shell can be methodically and initially broken away from the outer surface of the mandrel 40.

The stripping collar; element 106, FIGURE 2

As shown in FIGURE 2, a reinforced plastic wall 38 for a tank half 20 is laid up on the outer surface of the mandrel 40. This reinforced plastic wall 38 extends from the periphery of the end cap 22 or 94, substantially the full length of the mandrel 40. As previously mentioned, the reinforced plastic wall 38 is laid up in a manner to partially overlap the peripheral edge of the previously formed end cap 22 and 94. Thus, when the fresh resin of the reinforced plastic wall 38 is cured to a hard solid state, a bond is formed with the end cap 22 or 94 to produce an integral tank half shell 20.

The back end of the reinforced plastic wall 38 is laid up against a stripping collar 106. This is a large ring structure made of reinforced synthetic resin. The stripping collar is suitably formed by being laid up on the outer surface of the mandrel 40, e.g., the outer surface of the frustrum-shaped outer shell 68, using pattern wax for clearance and a suitable release agent as required. The stripping collar 106 can then be scored at the front to indicate a squared edge and then removed from the mandrel and cut to a square edge 108, FIGURE 2. The square edge 108 provides a form or face against which the tank wall 38 can be laid and also provides a ram surface for pushing the completed tank half 20 off the mandrel, over the small end, utilizing the taper of the outer shell 68 for release purposes.

Figure 5:
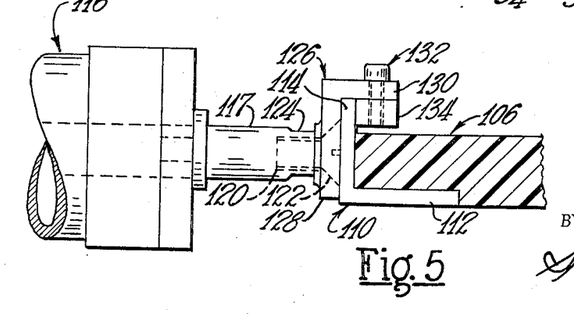
FIGURE 5 is an enlarged fragmentary view, partly in section, showing the manner in which the hydraulic cylinders 116 are connected to the back edge of the stripping collar 106.

Also, when the stripping collar 106 is removed for the cutting of the square edge 108, it is appropriately notched to receive angle brackets 110, best shown in FIGURE 5. These angle brackets 110 take the form of short segments of angle iron and are placed at the back edge of the stripping collar 106. One arm 112 is placed in the notch formed on the under surface of the stripping collar 106 and the other arm 114 is abutted against the back edge of the stripping collar. The back face of the radially extending arm 114 thus provides a thrust face against which the ram force of the push off cylinders 116 can be applied. Additionally, as will be described, the radial arms 114 provide gripping lips which are used to return the stripping collar 106 to its retracted position after a stripping operation has been completed.

It will be evident that as the stripping collar 106 is moved along the outer surface of the mandrel 40, with sufficient force, it can effect a stripping operation. When moved to the right, viewing FIGURE 2, the stripping collar 106 will impart a force against the tank half 20 to strip it from the mandrel 40. This presumes, of course, that the cylinders 116 all push against the back edge of stripping collar 106 to develop a substantial force.

When the hydraulic cylinders 116 are reversed, the stripping collar will be returned so that the forming operation can be repeated.

Viewing FIGURE 2, it is to be understood that modifications to the invention can be provided at this point. These are encompassed within the scope of the invention. Thus, viewing FIGURE 2, an auxiliary sleeve can be slipped on from the front end of the mandrel to abut stripping collar 106. By making these auxiliary sleeves of appropriate axial lengths, tank halves of different sizes can be made. Thus, 5,000 gallon or 6,000 gallon, or other size tanks can be made, depending upon the size of the auxiliary sleeve placed around the outer surface of the mandrel 40 in front of the stripping collar 106.

The hydraulic stripping system

*The push off cylinders.*—The hydraulic stripper system 155 is mounted on the back side of the welded steel end structure 72. As previously mentioned, this system 155 comprises a plurality of push-off cylinders 116 that all bear with equal thrust force against the back edge of the stripping collar 106, FIGURE 2. This is effective to strip the finished tank half 20 from the mandrel 40.

Figure 6:
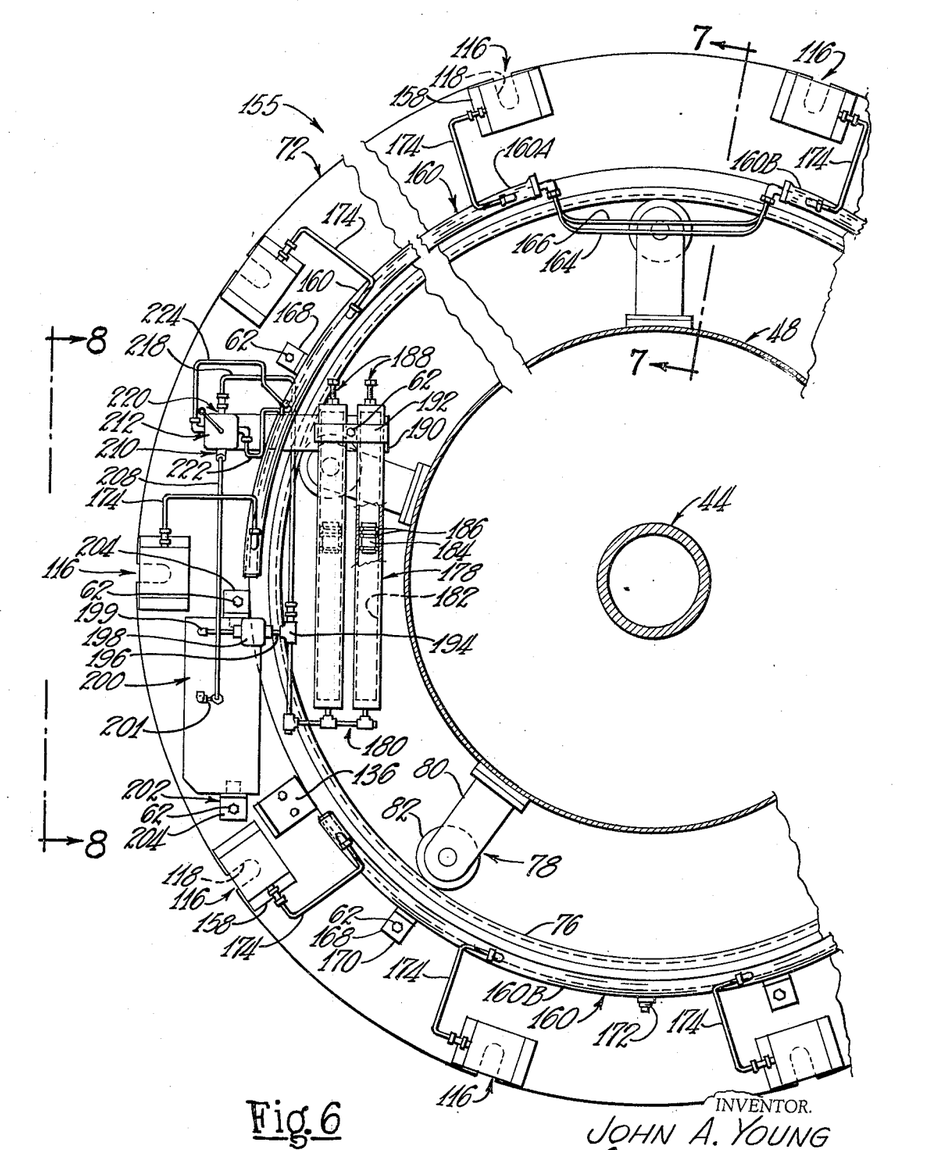
FIGURE 6 is an end elevational view of the hydraulic stripper system 155, taken as along the line 6—6 of FIGURE 2.
Figure 7:
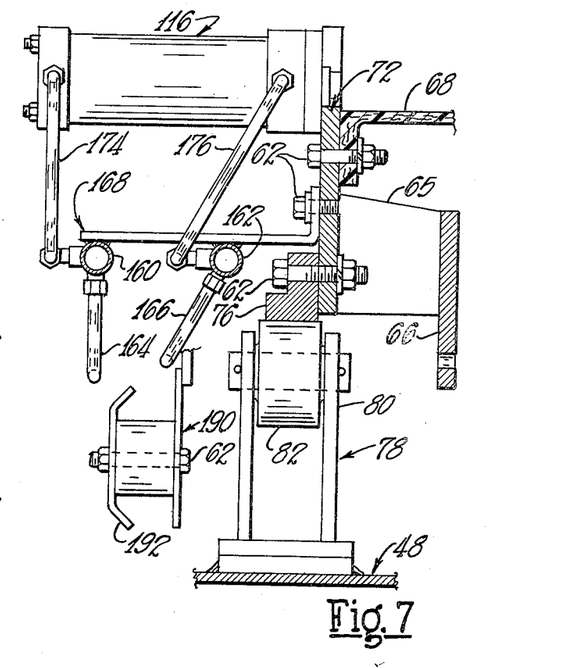
FIGURE 7 is a sectional view, taken along the line 7—7 of FIGURE 6.

The push-off cylinders 116 are shown in FIGURE 2, as well as in FIGURE 7, and are fastened to the back side of the welded steel end structure 72. As shown in FIGURES 3 and 6, the periphery of the end structure 72 is provided with ten (10) notches 118. The cylinders 116 are bolted to the back surface of the end structure 72 in alignment with the notches 118 and the piston rods 117, FIGURE 5, are passed through the notches.

The manner in which the push-off cylinders 116 are mounted to the back side of the end structure 72 is shown clearly in FIGURES 6 and 7. More particularly, as shown in FIGURE 6, for each cylinder 116 there is a hydraulic cylinder head rectangular flange mounting 158, by which each cylinder is bolted to the end structure 72.

FIGURE 5 illustrates the manner in which the piston rods 117 of the hydraulic cylinders 116 are attached to the angle brackets 110 and thus to the back edge of the push-off ring 106. Thus, the end of the piston rod 117 is provided with a threaded hole 120 to receive a flat head machine screw 122. Flats 124 are provided so that the piston rod 117 can be held by a wrench for tightening the machine screw 122. A hydraulic cylinder attachment bracket 126, similar to a short piece of angle iron, has one arm 128 bored to receive the machine screw 122. The other arm 130 is drilled to pass a cap screw 132 which threads into a cleat 134. The cleat 134 oversteps the top edge of the vertical arm 114 of the angle bracket 110, thus providing a pull connection to the angle bracket. By this means, the stripping collar 106 can be reversed when the piston rod 117 is retracted, after a stripping operation is completed.

The headers

Figure 8:
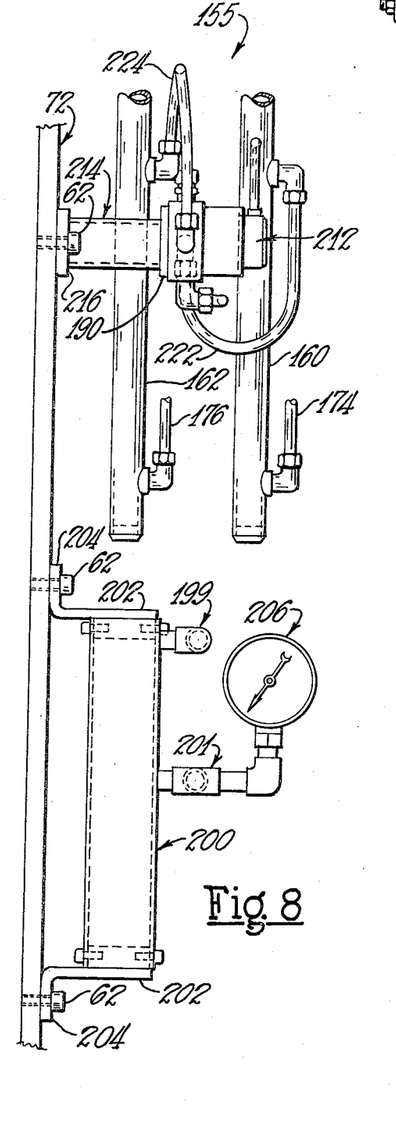
FIGURE 8 is a fragmentary side elevational view, taken along the line 8—8 of FIGURE 6.

As shown in FIGURES 6, 7 and 8, each hydraulic cylinder 116 is connected to two (2) oil headers: a rear header 160 and a front header 162. The rear oil header 160 supplies oil to the back side of the piston of each cylinder 116. This is effective to drive the piston rod 117, FIGURE 5, out of the cylinder for the push-off stripping operation. The front oil header 162 supplies oil to the front side of the piston of each hydraulic cylinder 116. This is effective to return the piston rod back into the cylinder 116 and withdraw the stripping collar 106, FIGURES 2 and 5, back to the position for the next lay-up operation. In FIGURE 6, the front header 162 is generally hidden behind the rear header 160. However, both headers 160 and 162 are shown in FIGURES 7 and 8.

As shown in FIGURE 6, the headers 160 and 162 each comprise two (2) segments of arcuate shape as represented by the segments 160A and 160B. These segments are connected together by lengths of jumper tubing 164 and 166 as shown on the right side of FIGURE 6, and in FIGURE 7. This arrangement provides a substantially complete loop to feed all of the hydraulic cylinders 116 with pressurized fluid as required.

The headers 160 and 162 are welded to brackets 168. The feet 170 of the brackets 168 are drilled and bolts 62 are used to secure them to the end structure 72.

Each header 160 and 162 is provided with a pipe plug 172 for air bleed in filling the system 155.

As shown in FIGURE 7, and in FIGURE 6, the rear header 160 is connected to a cylinder 116 by means of a jumper tube 174. The front header 162 is connected to a cylinder 116 by means of a jumper tube 176.

The accumulator, pump and four-way system; left side of FIGURE 6

The hydraulic system 155 is completely sealed. This is made possible by piston accumulators 178. Two piston accumulators 178 are shown, feeding into a common header system 180. However, this is not limiting on the invention; and one large accumulator 178 can be used if desired.

Each accumulator 178 includes a cylinder 182 of appropriate capacity. Within the cylinder 182 there is a floating piston 184. Ring seals 186 are provided between the piston 184 and the inside wall of the cylinder 182. A vacuum is maintained between the bottom side of each piston 184 and the hydraulic fluid contained within the accumulator 178.

At the top, each accumulator 178 is provided with an air relief and automatic oil check valve 188 to retain any oil that might leak past the piston 184 over long periods of use. The valves 188 also provide a means for relieving any oil build-up on the upper side of the piston 184. This relief is provided by inverting the system, e.g., turning the mandrel to an appropriate location, opposite that shown in FIGURE 6, and draining any leakage, as necessary.

The accumulators 178 are fastened to the welded steel end structure 72 by means of a bracket 190, shown in FIGURES 6 and 8, and also shown schematically in FIGURE 7. A clamp arm 192 and a bolt 62 hold the accumulators 178 in place against the bracket 190.

As mentioned above, the accumulators 178 feed into a common header system 180. The header system 180 leads to a pipe T 194. From the T 194, a branch line 196 leads to a strainer 198 and into the intake side 199 of a pump 200. The pump 200 is shown in FIGURES 6 and 8. Pump mounts 202, with bolts 62 through the feet 204, hold the pump 200 to the back side of the welded steel end structure 72, as shown in FIGURE 8. The pump 200 is broadly designated as such and can be a hand or power operated mechanism. The pump 200 and the remainder of the hydraulic system 155 rotate during the rotation of the mandrel 40 for the tank half forming operation. Therefore, when a powered pump is used, as for example an air-driven pump, a disconnectable power means is employed. A pressure gauge 206, FIGURE 8, is provided for operational purposes.

From the outlet 201 of the pump 200, a line 208 leads to the inlet 210 of a four-way valve 212.

Mounting for the four-way valve

As shown in FIGURE 8, the four-way valve 212 is actually mounted on top of the bracket 190 which supports the accumulators 178. Beneath the accumulator bracket 190, there is a four-way valve mount 214. The bolt 62 is passed through the foot 216 to secure the mount 214 to the welded steel end structure 72.

From the pipe T 194, a branch line 218 also leads to the outlet 220 of the four-way valve 212. A jumper tube 222 leads from the four-way valve 212 to the rear header 160. A jumper tube 224 also leads from the four-way valve 212 to the front header 162. The connection of the jumper tubes 222 and 224 to the headers 160 and 162 is also clearly shown in FIGURE 8.

On one setting of the four-way valve 212, pressurized hydraulic fluid from pump 200 flows via jumper tube 222 to the rear header 160, thence via each of the jumper tubes 174 to the back side of each cylinder 116 to drive the pistons in a manner to push the piston rods 117 out for a push-off operation. Fluid from the front of each cylinder returns via jumper tube 176 to the front header 162, thence via a jumper tube 224 back into the four-way valve 212, back out the outlet 220 of the four-way valve and back through the branch line 218 to the T 194. Supply to the pump 200 and the accumulators 178 is automatically provided at the location of the T 194.

With the four-way valve 212 in the reverse setting to that described above, fluid can flow via a jumper tube 224 to the front header 162 and thence via each of the jumper tubes 176 to the front side of each cylinder 116 to retract the piston rods 117, FIGURE 5. This retracts the stripping collar 106 for a new forming operation. Fluid from the back end of each cylinder 116 simultaneously returns via jumper tube 174 to the rear header 160, thence via jumper tube 222 to the four-way valve 212; then out the outlet 220 and back through the branch line 218 to the pipe T 194. Supply to the pump 200 and the accumulators 178 is automatically provided at the location of the pipe T 194.

From the foregoing it will be evident that a novel system is provided for either advancing all of the piston rods 117 simultaneously to push against the stripping collar 106; or, to retract all piston rods 117 simultaneously to retract or to withdraw the stripping collar 106. Further, the system is completely sealed, which is very important to allow the entire mechanism to rotate for the tank half forming operation.

Operation of the invention (1) First, a tank end cap 22 is positioned against the end of the mandrel 40 in the manner illustrated in FIGURE 2, by means of a dead-center mechanism as schematically shown in FIGURE 1. Thereafter, viewing FIGURE 2, a release agent is applied, and a wall of reinforced plastic material 38 is laid up between the rear surface of the end cap, be the end cap a convex unit 22 or a flat end unit 94, back to the front square edge 108 of the stripping collar 106. During all of this time, the mandrel is rotated and the hydraulic system, being sealed and disengaged from any power source, is free to rotate.

(2) When the cure is completed, the mandrel rotation is stopped and adjusted to approximately the position shown in FIGURE 6 of the drawings. As best shown in FIGURE 2, pairs of air line leads are attached to the various pairs 140 of lines by which air is placed between a segment 70 of the outer shell 68 and the reinforced plastic part. As previously mentioned, this breaks the part loose from that segment, and this is repeated methodically around the periphery.

(3) The pump 200 of the hydraulic system 155 is then actuated either manually or by power in order to drive the piston rods 117 forward and thereby push the stripping collar 106 to the right in FIGURE 2, in a manner to break the part loose from the mandrel. It is to be understood that the manner of movement is only on the order of four (4) or five (5) inches. When this movement is completed, the part can be removed by means of a suitable lifting dolly because of its freedom of release from the outer surface of the mandrel 40.

Note, then, a subtle action of the invention in that an air release is first provided, followed by the push-off operation.

It will be evident that the jacking pressure is uniform at the back of the part and this is uniformly distributed to the welded steel end structure 72 of the mandrel. Accordingly, a uniform tensile force is applied to the outer surface of the mandrel, thus avoiding distortion of either the tank half 20 or the outer shell 68.

When it is considered that up to fifty (50) tons of force are required for the stripping operation, the delicacy of control inherent in the present invention will be appreciated.

I claim:

1. In a mandrel for forming hollow reinforced plastic parts,
   an elongated, endless, hollow, inner wall supported for rotation in space with one end exposed for axial removal of a formed part, by stripping over said one end, said inner wall having an axis,
   an outer shell comprising an endless annular wall spaced from said inner wall and having an exposed outer surface upon which parts of reinforced synthetic resin can be laid up,
   means holding said inner wall and said outer shell in fixed axial relationship,
   link means extending between the inner surface of said outer shell and the outer surface of said inner shell,
   means connecting one end of said link means and said outer shell in pivoted relation, means connecting the other ends of said link means and said inner wall in pivoted relation,
   and means for radially adjusting said link means and thus said outer shell relative to said inner wall, and for holding said adjusted relation.

2. The invention of claim 1 wherein said outer shell is a frustum, with the small end exposed for axial removal of a formed part.

3. The invention of claim 1 wherein said outer shell is fabricated of reinforced synthetic resin.

4. The invention of claim 3 wherein said outer shell is a frustum.

5. The invention of claim 2 including means at the large end of said mandrel for forcing a formed part axially off the exposed small end.

6. The invention of claim 4 including means at the large end of said mandrel for forcing a formed part axially off the exposed small end.

7. The invention of claim 2 including means for injecting compressed gas between said exposed outer surface and a part formed thereon.

8. The invention of claim 4 including means for injecting compressed gas between said exposed outer surface and a part formed thereon.

9. The invention of claim 1 including radial rib means on the interior of said outer shell,
elongated link anchor bar means extending axially adjacent to the outer surface of said inner wall, and within said outer shell,
said link means extending between said rib means and said anchor bar means, means connecting one end of said link means and said rib means in pivoted relation, means connecting the other ends of said link means and said rib means in pivoted relation,
and means for radially adjusting said link anchor bar means and thus said links and outer shell relative to said inner wall, and for holding said link anchor bar means to said inner wall.

10. The invention of claim 9 wherein said radial adjusting means comprises screw means extending through said inner wall and engaging said anchor bar means, and said means for holding said link anchor bar means comprises screw means extending through said inner wall and grasping said anchor bar means.

11. The invention of claim 10 wherein said holding screw means extend through said inner wall and into threaded holes in said anchor bar means.

12. The invention of claim 9 wherein said outer shell is a frustum, with the small end exposed for axial removal of a formed part.

13. The invention of claim 9 wherein said outer shell is fabricated of reinforced synthetic resin.

14. The invention of claim 13 wherein said outer shell is a frustum.

15. The invention of claim 12 including means at the large end of said mandrel for forcing a formed part axially off the exposed small end.

16. The invention of claim 14 including means at the large end of said mandrel for forcing a formed part axially off the exposed small end.

17. The invention of claim 12 including means for injecting compressed gas between said exposed outer surface and a part formed thereon.

18. The invention of claim 14 including means for injecting compressed gas between said exposed outer surface and a part formed thereon.

19. The invention according to claim 2, including radial wall means at the large end of said outer shell, and means fastening said radial wall means and said large end together, said radial wall means having a front side facing toward said exposed outer furnace, and a back side facing away from said outer surface,
an annular stripping collar slidable axially along said exposed outer surface,
hydraulic cylinder means connected to the back side of said radial wall means, with piston rod means extended through openings in said wall means, and means connecting said piston rod means to said stripping collar to move said collar along said outer surface,
said hydraulic cylinder means being arranged to apply uniform part stripping force all around the periphery of said stripping collar,
and power means for driving said hydraulic cylinder means.

20. The invention of claim 19 wherein said hydraulic cylinder means comprise a plurality of cylinders arranged around the periphery of said mandrel, and said power means is adapted to drive said hydraulic cylinders in unison.

21. The invention according to claim 2 including radial wall means at the large end of said outer shell, and means fastening said radial wall means and said large end together, said radial wall means having a front side facing toward said exposed outer surface, and a back side facing away from said outer surface,
an annular stripping collar slidable axially along said exposed outer surface,
jack means connected to the back side of said radial wall means, with force-transmitting means extending through opening in said wall means, and means connecting said force-trasmitting means to said stripping collar to move said collar along said outer surface,
said jack means being arranged to apply uniform part-stripping force all around the periphery of said stripping collar;
and power means for driving said jack means.

22. The invention of claim 21 wherein said jack means comprise a plurality of individual jack units arranged around the periphery of said mandrel, and said power means is adapted for driving said jack units in unison.

23. In a mandrel and stripping system of the class described, including a mandrel rotatably supported in space and having endless wall means carrying a tapered outer surface upon which parts of reinforced resin can be laid up, and the mandrel having an axis,
stripper means located at the large end of said mandrel, comprising radial wall means, and means fastening said radial wall means and said large end together, said radial wall means having a front side facing toward said outer surface, and a back side facing away from said outer surface,
an annular stripping collar slidable axially along said outer surface
jack means connected to the back side of said radial wall means, with force-transmitting means extending through openings in said wall means, and means connecting said force-transmitting means to said stripping collar to move said collar along said outer surface,
said jack means being arranged to apply uniform part stripping force all around the periphery of said stripping collar,
and power means for driving said jack means.

24. The invention of claim 23 wherein said jack means comprise a plurality of individual jack units arranged around the periphery of said mandrel, and said power means is adapted for driving said jack means in unison.

25. The invention according to claim 23 wherein said jack means comprise hydraulic cylinder means, said force-transmitting means comprise piston rod means, and said power means is a sealed hydraulic system including a pump and reservoir interconnected, and rotatable with said mandrel.

26. The invention according to claim 25 wherein said hydraulic cylinder means comprise a plurality of cylinders arranged around the periphery of said mandrel; and said power means is adapted to drive said hydraulic cylinders in unison.

27. In a method of forming a cup-like part on the tapered endless forming surface of a forming mandrel, the steps of connecting to the mandrel at the large end, radial wall means having a front side facing toward the endless forming surface, and a back side facing away from said forming surface, placing a slidable annular stripping collar on said forming surface adjacent to said radial wall means, placing a preformed end cap of hardenable material over the small end of the mandrel and in at least partially overlapping relationship to said endless forming surface, forming an endless wall of hardenable material over said endless forming surface and joining it to said end cap to make the cup-like part, and then exerting a stripping force against said stripping collar, from said radial wall means, to thereby move said stripping collar away from said radial wall means to strip said part from said mandrel.

28. The invention of claim 27 including the step of introducing compressed gas between said endless wall of hardenable material and said forming surface to break said cup-like part loose, before exerting said stripping force.

29. The invention according to claim 27 including the step of placing an auxiliary sleeve over said forming surface and against said stripping collar, then placing the preformed end cap over the small end of the mandrel and thereafter forming the endless wall of hardenable material over the remaining area of the forming surface and joining it to the end cap to produce the cup-like part, and then stripping the cup-like part from the mandrel in the manner described.

30. The invention according to claim 29 including the step of introducing compressed gas between said endless wall of hardenable material and said forming surface to break said cup-like part loose, before exerting said stripping force.

References Cited
UNITED STATES PATENTS

| | | | |
|---|---|---|---|
| 2,979,110 | 4/1961 | Henley | 156—415 |
| 3,160,546 | 12/1964 | Burton | 156—415 |
| 3,178,331 | 4/1965 | Bishop et al. | 156—415 |
| 3,207,648 | 9/1965 | Shilts | 156—415 |

BENJAMIN A. BORCHELT, Primary Examiner

T. H. WEBB, Assistant Examiner

U.S. Cl. X.R.

156—415